(12) United States Patent
Miller et al.

(10) Patent No.: US 6,233,015 B1
(45) Date of Patent: May 15, 2001

(54) CAMERA WITH USER COMPLIANT BROWSE AND DISPLAY MODES

(75) Inventors: Michael E. Miller, Rochester; Richard W. Lourette, Fairport, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/883,725

(22) Filed: Jun. 27, 1997

(51) Int. Cl.$^7$ .................................................. H04N 5/222
(52) U.S. Cl. ............................. 348/333.05; 348/333.11; 348/222
(58) Field of Search ..................................... 348/222, 231, 348/232, 233, 239, 333.01, 334, 333.04, 341, 333.05, 333.11, 333.12

(56) References Cited

U.S. PATENT DOCUMENTS

| | | | |
|---|---|---|---|
| 4,742,369 | 5/1988 | Ishii et al. | 354/441 |
| 4,827,347 | 5/1989 | Bell | 358/224 |
| 5,130,800 | 7/1992 | Johnson et al. | 358/183 |
| 5,157,511 | * 10/1992 | Kawai et al. | 358/564 |
| 5,164,751 | 11/1992 | Weyer | 354/76 |
| 5,184,227 | * 2/1993 | Foley | 358/302 |
| 5,389,984 | 2/1995 | Lovenheim | 354/76 |
| 5,633,678 | * 5/1997 | Parulski et al. | 348/232 |
| 5,742,339 | * 4/1998 | Wakui | 348/233 |
| 5,796,428 | * 8/1998 | Matsumoto et al. | 348/231 |
| 5,861,918 | * 1/1999 | Anderson et al. | 348/233 |
| 5,973,734 | * 10/1999 | Anderson | 348/239 |
| 6,020,920 | * 2/2000 | Anderson | 348/222 |
| 6,097,431 | * 8/2000 | Anderson et al. | 348/233 |
| 6,122,003 | * 9/2000 | Anderson | 348/207 |
| 6,147,703 | * 11/2000 | Miller et al. | 348/220 |

* cited by examiner

Primary Examiner—Wendy R. Garber
Assistant Examiner—Jacqueline Wilson
(74) Attorney, Agent, or Firm—Pamela R. Crocker

(57) ABSTRACT

A camera with: means for capturing an image of a real world scene as an image signal; storage means for storing captured images and from which stored images can be read; a screen; and a means for displaying on the screen a high resolution version of a stored image from a list of stored images when a location within the list is selected. The camera also has a means for displaying on the screen, when a browsing mode is selected, a scrolling strip of low resolution versions of stored images from the list. A single control allows a user to select the location within the list and which also allows a user to select the browsing mode. The camera can a user to move between full screen display of stored images and the browsing mode multiple times, with little repetitive finger and/or hand motion, without blocking viewing of the screen, and while allowing the hands to be retained in a convenient picture taking position.

11 Claims, 6 Drawing Sheets

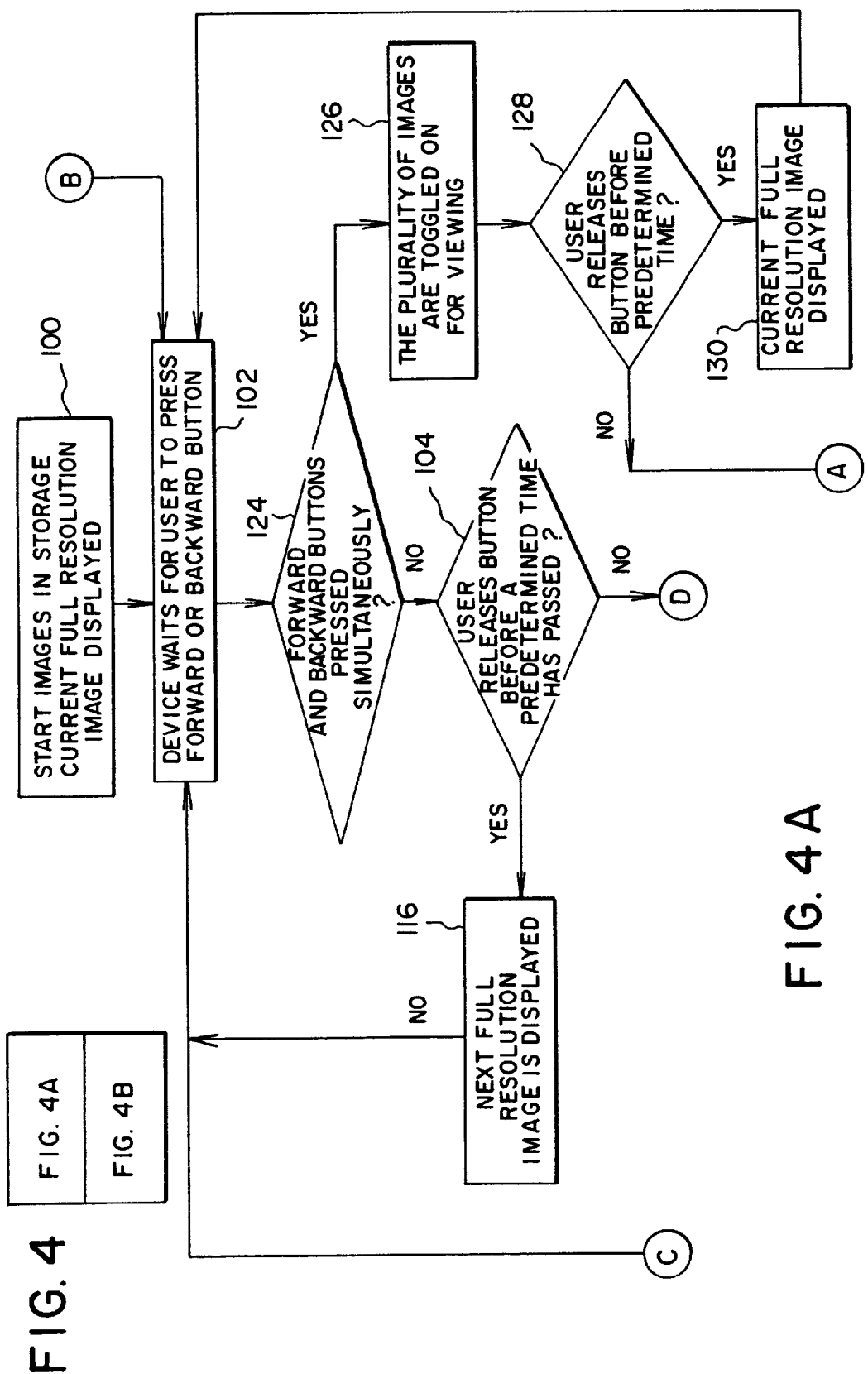

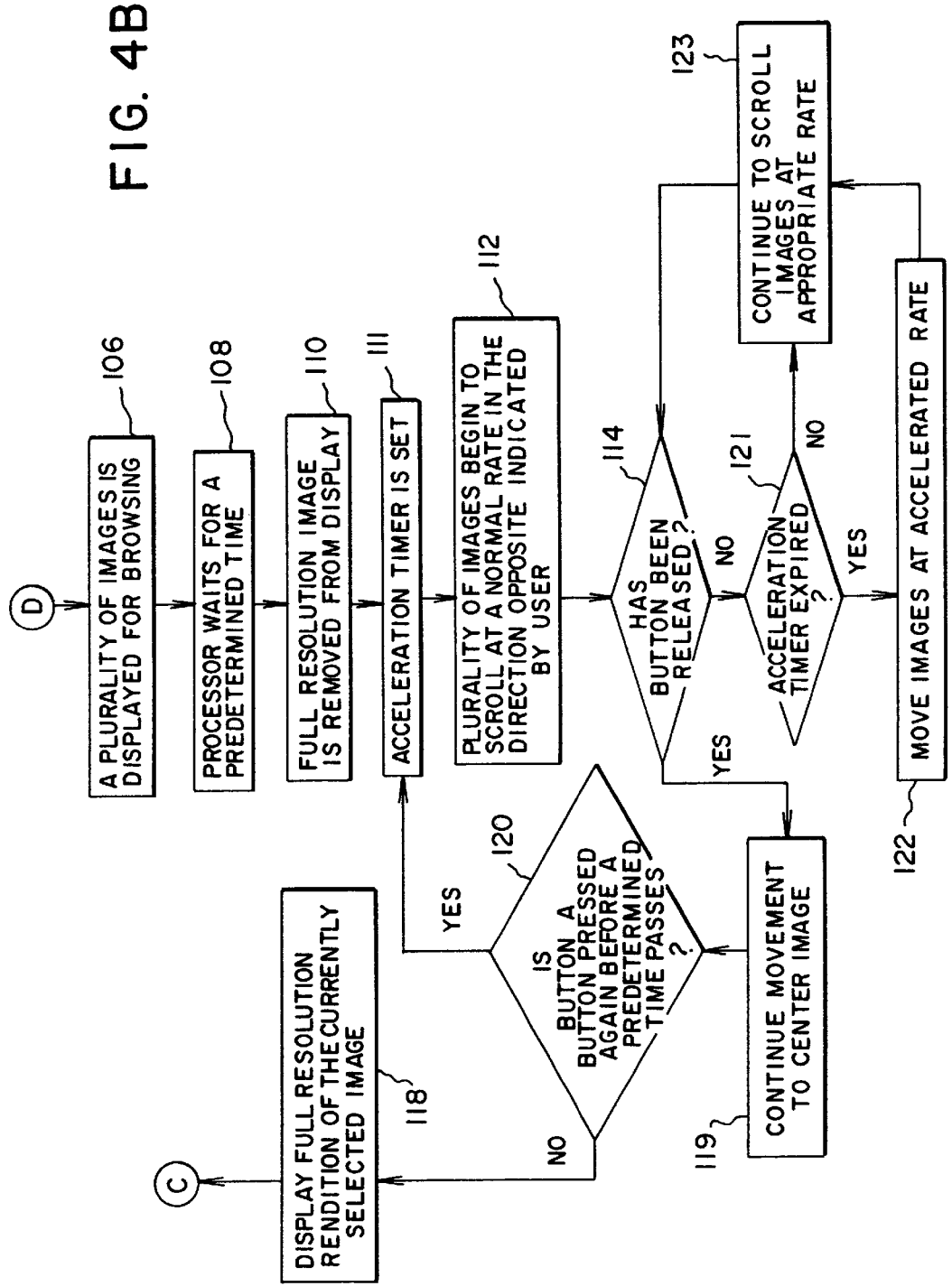

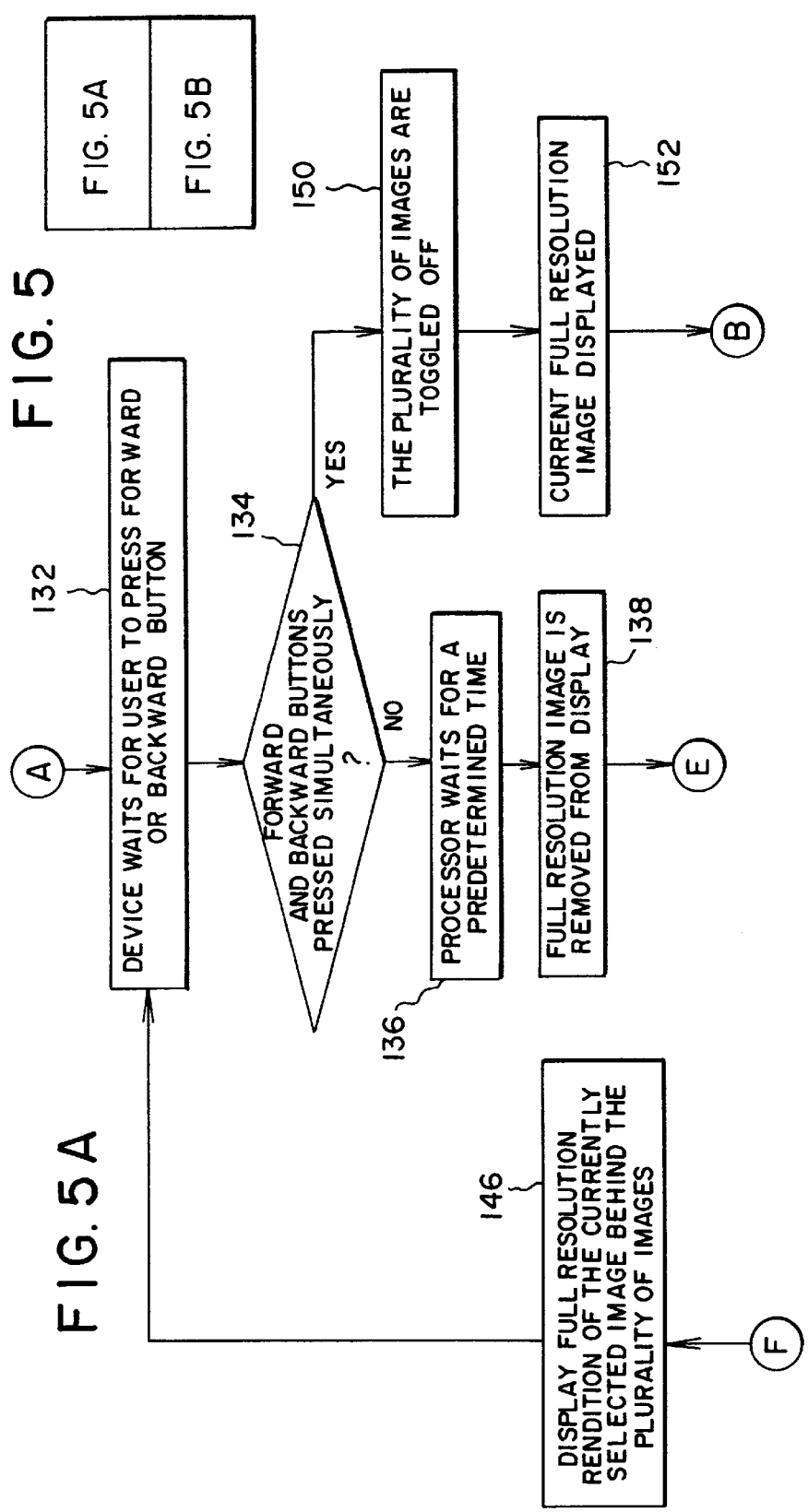

CAMERA WITH USER COMPLIANT BROWSE AND DISPLAY MODES

The invention relates generally to the field of photography, and in particular to electronic cameras.

BACKGROUND OF THE INVENTION

Traditional silver halide cameras typically display the number of the current frame to be exposed to the user. The user must use this information in conjunction with the number of frames available in the film canister to calculate the number of frames that remain to be exposed. All of this information is never provided to the user in a concise fashion and the number has to be read and understood. Recently introduced Advanced Photographic System ("APS") cameras will provide some assistance in this area by providing a number that corresponds to the number of frames remaining to be exposed. However, the user will have no method for determining the number of frames that he or she has previously exposed. Computer software has recently become available which allows scrolling through many low resolution images, alone or in conjunction with a higher resolution image, on a computer platform. For example, the recently available PICTURE DISK software from Eastman Kodak, which is provided to a customer on a diskette along with scanned images from a roll of film, presents a screen in a Microsoft Windows environment with thumbnails of the images, and a vertical scroll bar on the Windows screen which allows a user to scroll through the thumbnails. Even in such computer software, once again the user must manually switch viewing modes or be satisfied with a high resolution image that fills only a portion of the display.

The above problem is exacerbated in cameras that provide an electronic review feature. Such cameras typically have a sensor (such as a CCD area array) to capture an image of the real world as a corresponding image signal, storage medium on which to store the captured image signals, and a screen on which any previously captured stored images can be reviewed. Such cameras include so called hybrid cameras, which capture images of the real world on conventional silver halide photographic film as well as corresponding image signals.

When searching through a database of stored images on such electronic cameras, the typical user often expresses the need to see both an image that fills nearly the entire screen and a plurality of images that can be used for image browsing to facilitate the search for a specific image. The need for an image to fill practically the entire screen is driven by the use of small, direct view displays where the display will generally be 5 inches in diagonal or smaller. Given this small image size, the user desires a larger image and is unwilling to accept an image which is significantly smaller than the entire display. At the same time, the user desires the ability to browse a number of images at a time to find a specific image in what could potentially be a stored list of hundreds of images. It is known that the ability to browse a number of images at one time can facilitate image search, especially when the list of images has some order that is perceptually relevant to the searcher.

Prior cameras, such as the Casio QV-10 and the Eastman Kodak DC 25, typically provide one viewing mode where the largest image possible is shown on the image display, and a second previewing mode where a plurality of smaller images are shown in a manner filling the entire display. The latter mode is more effectively used to search through a database of images as it provides the user the ability to quickly browse and scroll quickly through a number of images. However, the user must press a separate button to switch viewing modes each time that he or she wishes to search for an image after viewing the full resolution image. When the preview mode button is pressed, the larger size image is removed and replaced with a full screen of a number of smaller images. Within each of these modes, the camera provides forward and backward buttons for scrolling through the images either one at a time (in which case the images currently on the display move by one smaller image space on the display) or by a number equal to the number of smaller images shown on the display. When the smaller version of a desired image is positioned in a specific location of the preview screen, the user must again depress the preview mode button, at which point the full screen of smaller resolution images is replaced by a full screen version of the desired image. If on such prior cameras the user then wishes to see a full screen preview of another stored image in the image list, the foregoing procedure (push preview mode button, push scroll button until desired image found, then push preview mode button) must again be repeated.

The foregoing procedure can become exceedingly tedious. This is particularly true given that, in view of the small size of the smaller resolution images seen in the preview mode (and hence the difficulty in clearly seeing the image features), it may be necessary for the user to repeat this procedure several times before she finally has a full screen version of the image they really wish to see. Further, due to the portability requirements of cameras, and the desire to make them ever smaller, the controls necessarily are made smaller to save space. Repeating such a sequence of pressing one button, moving the controlling finger to another button, then back to the first button again, several times over on small buttons at different locations on an already compact camera body, can rapidly become an exercise in frustration for most consumers.

Additionally, to access multiple buttons while holding a camera, a consumer will typically use an index finger alone (which will typically require complete removal of one hand from a camera holding position with the camera held between both thumbs and forefingers of both hands), or will use two different fingers (which requires a relatively high degree of user dexterity). These actions require further hand and wrist motions as a consumer alternates between a picture taking mode with the two hands holding the camera, and a review mode in which the foregoing multiple button pressing sequence is repeated to access a full screen version of a desired image.

It would be desirable then, to provide an electronic camera wherein smaller resolutions of a multiple stored images can be reviewed, and a larger resolution of a then selected image displayed. In such a camera, it would be desirable to reduce or avoid a repetitive sequence of multiple button pushing in order to accomplish the review and obtain the full-screen image display. It would further be desirable if such a camera requires only relatively low dexterity and hand movement to accomplish multiple sequences of reviews and full screen displays.

SUMMARY OF THE INVENTION

The present invention provides a camera, which in one aspect comprises:

(a) means for capturing an image of a real world scene as an image signal;

(b) storage means for storing captured images and from which stored images can be read;

(c) a screen;

(d) a means for displaying on the screen a high resolution version of a stored image from a list of stored images when a location within the list is selected;

(e) a means for displaying on the screen, when a browsing mode is selected, a scrolling strip of low resolution versions of stored images from the list;

(f) a single control which allows a user to select the location within the list and which also allows a user to select the browsing mode.

In another aspect of the present invention, the camera comprises the foregoing elements except the single control which is replaced with:

(f) a first single control which allows a user to select the location within the list and which also allows a user to select the browsing mode; and (g) a second single control which allows a user to select the location within the list and which also allows a user to select the browsing mode.

The present invention then, provides an electronic camera wherein smaller resolutions of a multiple stored images can be reviewed, and a larger resolution of a then selected image displayed. In the camera of the invention, sequences of multiple button pushing in order to accomplish the review and obtain the full-screen image display, is reduced or eliminated. Further, a camera of the present invention can provide the foregoing review and full screen display, with relatively low dexterity and hand movement being required even to accomplish multiple sequences of reviews and full screen displays, and without blocking viewing of the screen during user operation of the single controls.

BRIEF DESCRIPTION OF THE DRAWINGS

Embodiments of the invention will now be described with reference to the drawings, in which:

FIGS. 4A and 4B, when taken together, is a flow chart illustrating the operation of the camera of FIG. 1.

FIGS. 5A and 5B, when taken together, is a flow chart illustrating the operation of the camera of FIG. 1.

To facilitate understanding, identical reference numerals have been used, where possible, to designate identical elements that are common to the figures.

DETAILED DESCRIPTION OF THE INVENTION

In a camera of the present invention, two display modes and a means for seamless switching between these modes is provided. The first of these modes will be referred to as image viewing mode. In this mode, the screen preferably will show a single image that is nearly the size of the entire screen. The second mode will be referred to as the browsing mode. In the browsing mode, the screen will show a plurality of smaller sized images (that is, smaller in size than the image of the image viewing mode) to facilitate browsing of numerous images during image search. In a camera of the present invention, a user can conveniently switch between these two modes.

Figure 1:
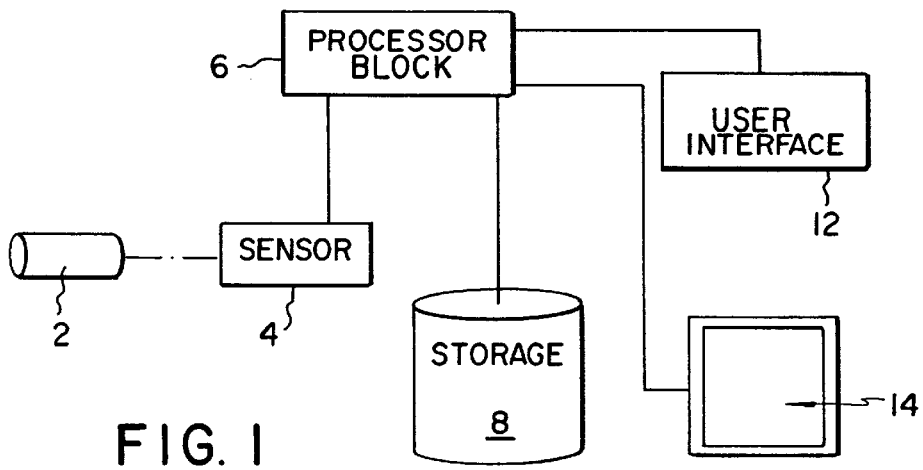
FIG. 1 is a schematic diagram of the camera of the present invention.

Turning first to the schematic of FIG. 1, the camera shown includes a lens 2 which directs light from real world scene onto a sensor 4. Typically the light passes through known shutter and aperture mechanisms (not shown), before falling on sensor 4. The shutter would be activated by a push button or similar user control. Sensor 4 is most typically a single array Charge Coupled Device ("CCD") sensor covered by a color filter array ("CFA"), or could be three CCD sensors with appropriate filters/mirrors (not shown) being provided to direct red, green, and blue light onto respective sensors. All of the camera elements in FIG. 1 will typically be mounted on/in a single housing (such as housing 20 of FIGS. 2 and 3). A battery compartment (not shown) is typically provided to receive one or more batteries for power. All of these are conventional elements in electronic cameras. The camera is preferably portable, weighing no more than about 5 kg and preferably less than 2 kg (or even 1 kg), without batteries. When taking pictures (that is, capturing images), camera housing 20 will typically be held in a normal picture taking position with each end 21a, 21b of housing 20 held between the thumb (on the back of the camera) and multiple forefingers (on the camera front) of a corresponding hand. References to components of the camera being above, below, to the side, and other phrases indicating relative positioning, are relative only with reference to the camera being in a horizontally positioned normal picture taking position (such as seen in FIGS. 2 and 3).

Processor block 6 includes appropriate circuitry including analog to digital converters, to convert the signal from sensor 4 to a digital signal for storage in storage device 8, in a known manner. Storage device 8 can be any suitable digital signal storage device, including optical, magnetic (such as a disk drive) or solid state memory devices. The actual memory media used in storage device 8 is preferably removable but need not be. Captured images of real world scenes in the form of corresponding digital image signals, can therefore be stored in storage device 8 in a list ordered in the sequence in which the images were stored, and retrieved therefrom by processor block 6 for viewing on user screen 14. Screen 14 may be any suitable compact, low power consuming screen, preferably a liquid crystal screen ("LCD"). Features of the camera are controlled by a user through the buttons and controls of a user interface 12. User interface 12 may include discrete buttons, force sensors, or any other apparatus that can receive an input from a human user and transform it into an electronic signal that can be provided to processor block 6. Processor block 6 may further include a processor and any other further required hardware or software (or combinations of hardware and software) to cause the camera to perform the functions of the present invention. Processor block 6 then, may act as the means for displaying both the images and graphics of the present invention in either the full screen or browsing modes.

As described above, an image viewing device of the present invention includes a means for displaying a high resolution representation of an image and a means for displaying a plurality of low or medium resolution representations of images. Additionally, the invention provides a means of seamlessly switching between these two views. A means for indicating the currently selected image within the plurality of low or medium resolution representations of images is required. The fact that the user can seamlessly switch between the two viewing modes, simplifies the user interface and reduces the time that the user will require to find an image in a database of images.

Figure 2:
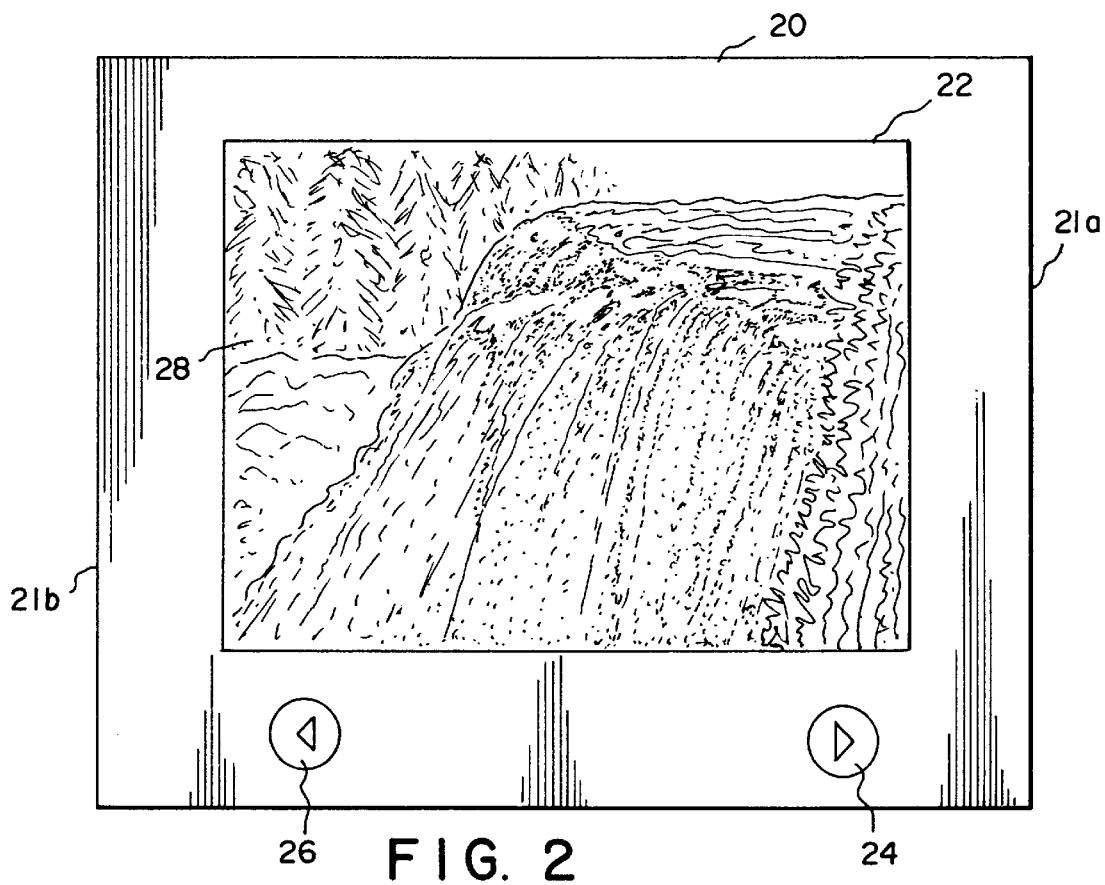
FIG. 2 is a back view of the camera of FIG. 1 illustrating a particular output on the screen of the image for normal viewing.
Figure 3:
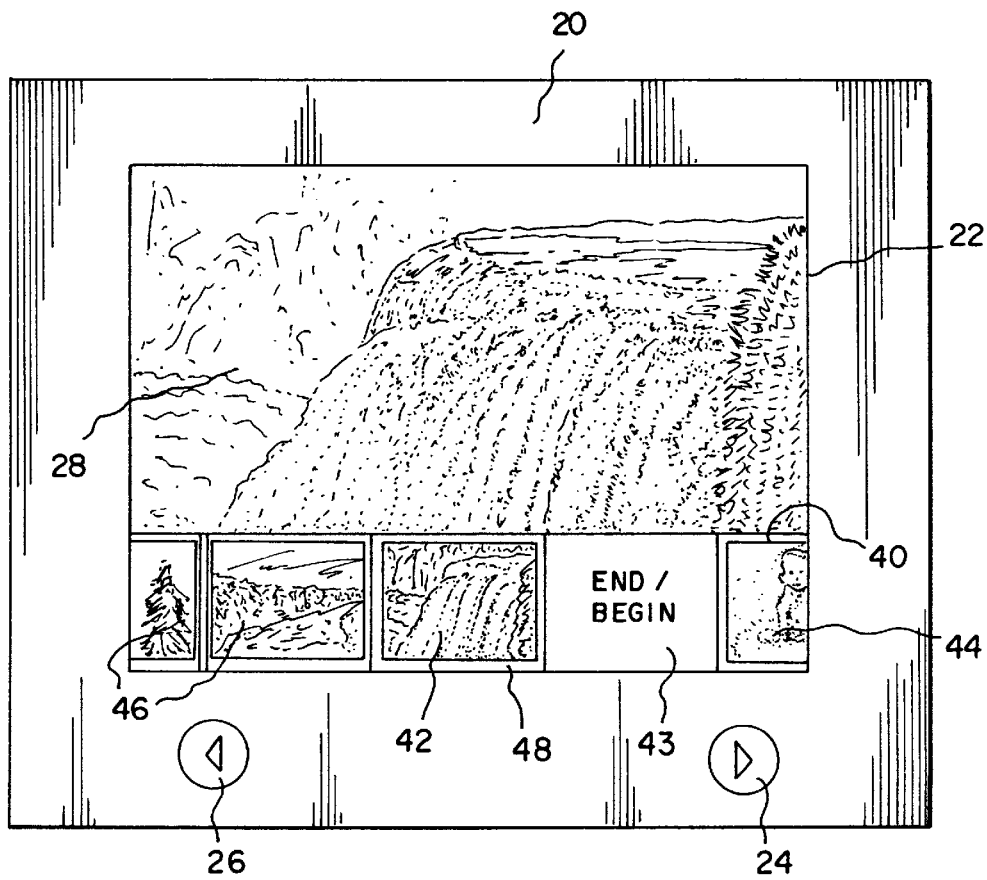
FIG. 3 is a back view of the camera of FIG. 1 illustrating a particular output of the images and graphics provided for image browsing.

Turning now particularly to FIGS. 2 and 3, the back of the housing 20 of the camera, is shown. The housing back has a centrally located LCD screen 14 and user interface controls in the form of forward and reverse buttons 24 and 26, respectively. Buttons 24, 26 have direction arrows on them, as shown in FIGS. 2 and 3, to indicate that they are forward and reverse buttons, respectively. As viewed from the back of the camera with the camera oriented in its normal horizontal picture taking and screen display position (as illustrated in FIGS. 2 and 3), the forward and reverse buttons 24, 26 are disposed near screen 14 and near right end 21a and left end 21b of housing 20. As images are stored in the camera a list of images (typically in the form of sequentially assigned image file names) are generated. When an image display mode is activated through a button (now shown) on user interface 12, a full screen version 28 (that is, a high resolution version) of a selected stored image in the list, is shown on screen 14 in the manner illustrated in FIG. 2. If the user wishes to simply page through the list of images, other full screen versions of stored images can be viewed as shown in FIG. 2, by paging through the stored images in the list, in sequence one after the other. A user may display full screen versions of different images in the list of stored images, by paging through the list of images in the full screen mode. Such paging can be accomplished by momentarily pressing forward or reverse buttons 24, 26, respectively, depending upon whether the user which to move forward or backward in the list of stored images. Each momentary press of forward button 24 or reverse button 26, brings up a full screen version of the next image in a forward or backward direction, respectively, in the list of stored images.

At any time, a user may wish to browse a plurality of images to search for a particular image in the list of stored images. To accomplish this, the user presses and holds either one of forward button 24 or reverse button 26 (depending upon whether he wishes to scroll through the image list forward or backward, respectively), for at least a predetermined time (previously set in processor block 6). The browsing mode will then be entered. In the browsing mode, the screen 14 may show a display such as depicted in FIG. 3. In this view, a graphical representation of a film strip 40 is overlaid the full screen version 28 of the currently selected image. By a film strip in this context, is referenced a series of images (usually in sequence from the list) from the list of stored images. The film strip is preferably a single line of lower resolution versions of the stored images (that is, each of lower resolution than the version of the same image displayed during the full screen mode). However, the film strip could be in the form of a two-dimensional matrix of low resolution versions of the stored images, for example. Film strip 40 includes a low resolution depiction of the currently selected image 42 being shown in the full screen version 28, as well as, at least in part, both images 44 forward of the selected image 42 in the image list, and other images 46 behind the currently selected image 42 in the image list. An indicator 48, in the form of a frame around the central image in the film strip indicates the selected image 42 which is displayed in the higher resolution full screen version 28.

If the user continues to depress the button 24 or 26, then after a further predetermined time (preset in processor block 6), film strip 40 will begin to scroll across screen 14 in a direction opposite the forward or reverse buttons 24, 26. That is, if forward button 24 has been depressed and held depressed beyond the predetermined time, film strip 40 will begin scrolling to the left as viewed in FIG. 3, with an image 46 repetitively disappearing off the left of screen 14 while a new image 44 simultaneously appears on the right of screen 14. The opposite would be the case if reverse button 26 has been depressed and held depressed beyond the predetermined time.

It will be seen from the foregoing and the further description below, that forward button 24 acts as a single control which allows a user to select the location within the stored image list, and which also allows a user to select the browsing mode. Similarly, reverse button 26 acts as a second single control in the same manner as forward button 24, except that in the browsing mode as entered through reverse button 26 the filmstrip 40 will scroll to right (versus scrolling to the left if the browsing mode is entered using forward button 24).

As seen from FIG. 3 in particular, film strip 40 occupies at least part of the same physical space on the screen 14 as the full resolution representation of the image 28. Therefore, the user is provided as large an image as possible when viewing the full screen version 28 of the selected image, and is also provided with a plurality of low resolution images in film strip 40 when browsing for a new image in the image list which she desires to select for display in the full screen version. It should also be noted that the user's desire to switch between the full screen and browsing modes is determined by the user from the nature of the interaction they provide the user with the camera. It is particularly useful that that in switching between the full screen and browsing modes, the user is not required to press additional buttons to initiate the transfer from one mode to the other. This avoids repetitive finger or hand movements from to different locations on the camera in order to switch between full screen and browsing modes. Furthermore, the arrangement with the forward and reverse buttons 24, 26 being spaced apart toward respective ends 21a, 21b of camera body 20 allows a user to readily operate buttons 24, 26 with their right or left thumbs, respectively, without having to completely remove either hand from the normal picture taking position Also, with buttons 24, 26 positioned beneath screen 14, (or alternatively, positioned on either side of screen 14), this avoids a user partially obscuring screen 14 while accessing the buttons (as would occur if buttons 24, 26 were positioned above screen 14.

The operation of the camera of FIGS. 1 through 3 will now be described in more detail, with reference to FIGS. 4A and 4B in particular.

Referring particularly to FIGS. 4A and 4B, as indicated therein, it will be assumed that a user has previously stored a number of images. The full resolution representation of the stored image at the user selected location is displayed (100) on the screen 14 by processor block 6. When the user presses a forward or backward button 24, 26 (102), this provides a user indication that he or she wishes to move to another position in the list of stored images. The processor block 6 then begins to monitor the time that occurs before the next event. If the user does not press the remaining forward or backward button within a time that might be intereperted as a simultaneous press of the two buttons (124) and if the user releases the forward or backward button 24, 26 (104) before a predetermined time has passed the processor block 6 then stops the timer and shows the full resolution representation of the next or previous image in the image list (116). However, if the user continues to hold down the forward or backward button 24, 26 for more than a predetermined time (104), the processor block 6 shows a plurality of images (42 through 46)and the film strip 40 on screen 14 with accompanying graphics comprising a frame selection box 48 (106).

At this point in time, the processor block 6 continues to monitor the time since displaying film strip 40. After a predetermined time has past (108), the processor block 6 removes the rendition of the full screen version 28 of the image from the screen 14 (110). This removal is one technique of de-emphasizing the full screen version 28 of the selected image (others include obscuring or dimming all or part of the full screen version 28). The processor block 6 then sets an acceleration timer (111) and advances through the image list in the direction indicated by the user when the forward or backward button 24, 26 was pressed (i.e., either the next image or the next screen of images) (112), and causes the film strip 40 to scroll across the screen in the direction opposite the direction of the button 24, 26 which is being held by the user. If the forward or backward button is released (114) by the user, the processor block 6 continues to move the images in the current direction until the next image is correctly located in the position for the selected image (which in the case of the embodiment of FIGS. 1–3, is the center of film strip 40 as shown by frame selection box 48) (119). Processor block 6 then waits for a predetermined time to insure that the user intended to release button 24 or 26 (120). If the user does not reactuate the button within this time period, the processor block 6 removes the plurality of images and displays the full screen version 28 (118) of the currently selected image (which is the image within frame selection box 48) after the selected image is centered. However, if the user has not in fact released the forward or backward button 24, 26 for the predetermined time before pressing the button again (120), processing block 6 once again resets the acceleration timer (111) and advances through the image list one image at a time in the direction indicated by the user when the forward or backward button 24, 26 was pressed (112). When advancing through the image list, the image at the side of the display opposite the direction of the button being pressed is removed from the screen 14. Each of the remaining images are then shifted in the direction opposite the direction of the button 24, 26 being pressed. A new image is then displayed in the empty spot in the film strip. This process is repeated as long as a button 24, 26 continues to be pressed. With a single discrete button, the images in film strip 40 advance at a constant rate across the display.

The ability to scroll through the images at an accelerated rate is also provided for. Once the plurality of images has been displayed (106) and the full resolution image has been obscured (110), a timer is started (111) to measure the elapsed time the user control is held actuated. While the plurality of images are advancing (112), if the user does not release the button (114) before the acceleration timer expires (121), then the rate at which the images are advanced is increased (122) and the images continue to scroll at the appropriate rate (123). If at any time during the advancement of images (112) the user control is released (114), and pressed again before a predetermined time (120), the acceleration timer will be reset (111) and the rate of image advancement will be changed to the normal rate (112). Again if the timer expires (121) before the button has been released (114), the plurality of images will advance at an accelerated rate (122).

If the user wishes to simply view a plurality of images, the user can press and hold both arrow keys simultaneously (124). When the user presses both the forward and backward buttons 24, 26 simultaneously (124), the plurality of images, the film strip and image selection indicator are toggled on for viewing (126). If the user releases the buttons 24, 26 before the timer expires (128), the the timer is reset and the current full resolution image is displayed again (130). The user is then required to release both user controls and the device waits for the user to press the forward or backward button again (132) in FIG. 5A.

Figure 5B:
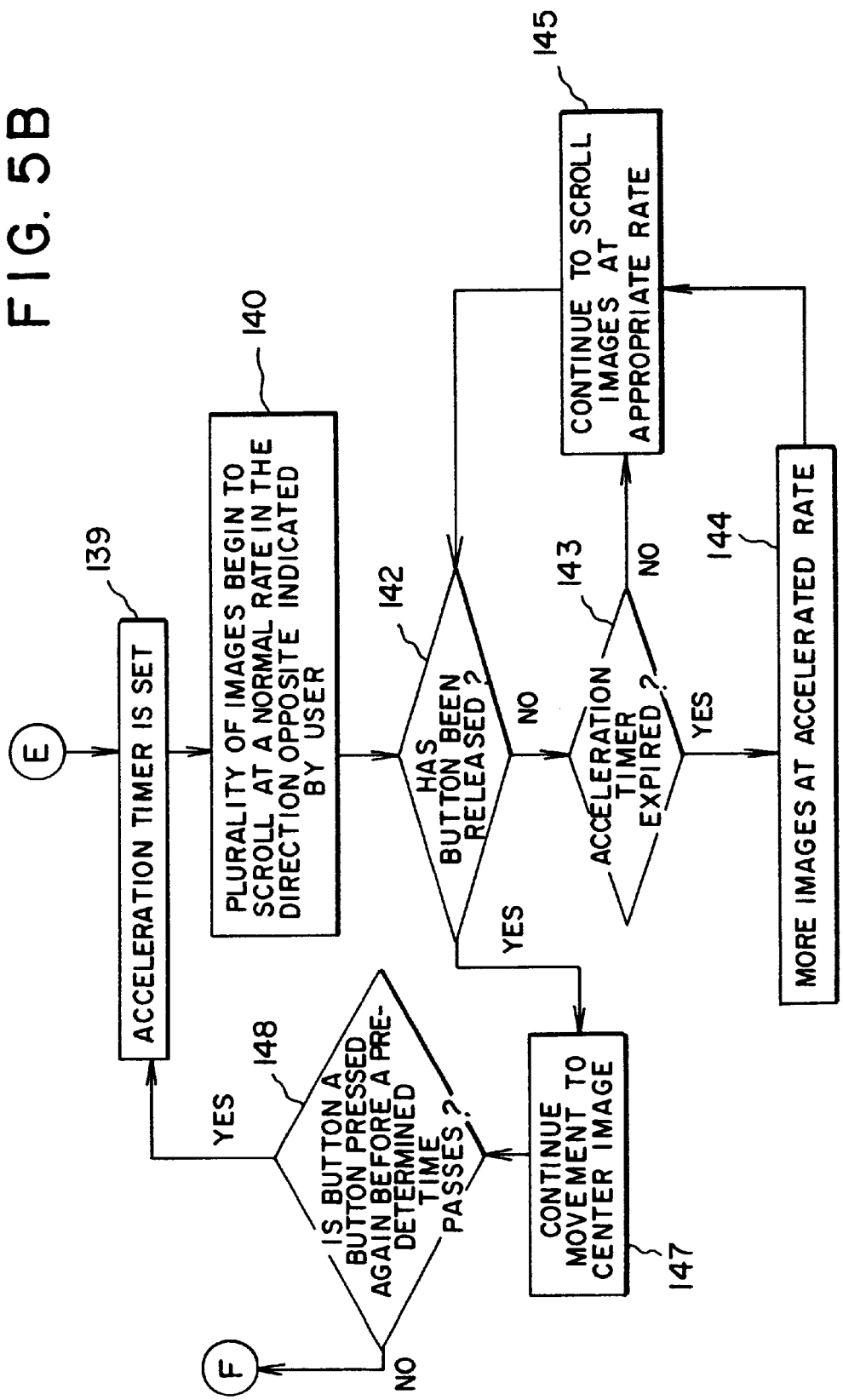

Referring to FIGS. 5A and 5B, once the film strip 40 is displayed on the screen for viewing, the user may continue to scroll the images while viewing the full screen version 28 of the selected image behind the film strip 40. During this time, the device waits for the user to press the forward or backward button 24, 26 (132). If these buttons are pressed simultaneously (134), the film strip 42 through 48 is toggled off (150) when the user releases both controls (146) and only the current full resolution image 28 is displayed (152). The image viewing device waits for the user to press the forward or backward button again (132). If the user presses a single button (134), the processor block 6 then waits for a predetermined time (136) and removes the full resolution image 28 from the display 14 (138). The acceleration timer is then set (13) and all images in the film strip 42 through 48 are then scrolled by one frame in the direction opposite that indicated by the button, and a new image is shown in the empty slot (140). If the user does not release the button (142), the acceleration timer is monitored and if it has not expired (143), the images will continue to move at a constant rate while the user control is held actuated (145). By "Scrolling" refers to a series of images in the list move across the display including in a continuous (that is, smooth) or discontinuous manner (that is the images jump from one location to the next, across the display). However, continuous scrolling is preferred.

If the user releases the control (142) while the images are advancing, the selected image will continue moving until it is centered (147). If the user has not pressed controls 24, 26 while the image was centering (148), the motion of the plurality of images will stop. If the user does not press a button again before a predetermined time has passed (148), the processor block 6 displays a full resolution version 28 of the selected image behind the plurality of images (146). If the user then presses a forward or reverse button 24, 26 before the image is centered (148), the acceleration timer is reset (139) and the images will be scrolled in the direction opposite that of the direction indicated by the user control (140).

The ability to scroll through the images at an accelerated rate is also provided for. While the plurality of images are scrolling (140), if the acceleration timer expires (144), before the user has released the scroll button (142) then the rate at which the images are advanced is increased (144). Alternatively, the scrolling speed could be varied in accordance with the time the control is actuated, or in accordance with the force the user applies to the user control (in which case buttons 24, 26 would produce a signal which varies with applied pressure).

As shown in FIG. 3, the scrolling of the filmstrip can be arranged to wrap within the list of images stored (that is, when the last image in the list has been displayed in the scrolling filmstrip, the scrolling then repeats starting with the first image). To enable a viewer to recognize when the scrolling filmstrip is wrapping, a frame 43 (or other textual or graphical representation) can indicate that the "END" of the list has been reached, and the first image in the list is about to be displayed following the "START" designation. The various predetermined times can be any time length considered suitable, including 0, 1, 2, 3, or more seconds.

Although the preferred embodiment has been described above, it will be recognized by a person of ordinary skill in the art that other navigational aids, such as image numbers or graphical indications of the location in storage of the currently select image, may be displayed in place of, or in addition to, the film strip 40. It should also be recognized by a person of ordinary skill in the art that an equally preferred embodiment might include forward and backward buttons 24, 26 that sense the amount of force employed by the user and that certain levels of force might be used to both change the values used for predetermined times and to affect the time that the processor block 6 waits after a button press before shifting an image within the film strip to show a new image.

The progressive display of information as described above allows the user to view a full screen rendition of the current image at all times except when he or she indicates the desire to browse a set of images by pressing and holding the forward or backward button 24, 26. The full resolution rendition of the current image is once again displayed when the user releases the forward or backward button 24, 26. This behavior allows the human interface of the camera to adapt to the needs of the user and eliminates the need for the user to repetitively move their fingers and/or hands to manually switch between the image viewing mode and the browsing mode.

The present invention could also be applied to display devices for reviewing images electronically stored on a media. This is particularly true of other portable display devices which, like the camera described above, will often have limited processing power and storage space. Such portable devices will generally weigh less than about 5 kg and preferably less than about 2 kg (and even less than 1 kg), without batteries. In such a device, the image capturing means (particularly, lens 2, sensor 4, and the hardware and/or software components of processor block 6 which convert the signal from sensor 4 to a digital electrical signal) can be eliminated and the storage means can be replaced by a media reader for reading images stored on the media. The other features of such a portable device can be the same as for the cameras described above, although viewfinder 22 (FIGS. 2 and 3) can also be eliminated.

In such a device, the media reader will preferably use a removable media using any suitable media, such as optical, magnetic or solid state memory media described above. Optionally, the media reader could be a storage device such as storage device 8, which also can store image signals on the storage media. Such image signals might be received from a remote source (such as over a telephone line, network interface, radio link, or other communications link). In this case then, the portable display device would be as illustrated in FIGS. 1 to 5B, except lens 2 is deleted and sensor 4 is replaced by a suitable interface module (such as a modem, network interface or other communications hardware) with processor block 6 including any further necessary hardware and/or software. Such a display device may incorporate all other features of the camera describe above, and execute the methods described above for displaying stored images.

The invention has been described in detail with particular reference to certain preferred embodiments thereof, but it will be understood that variations and modifications can be effected within the spirit and scope of the invention.

PARTS LIST

2 Lens
4 Sensor
6 Processor Block
8 Storage Device
12 User Interface
14 User Screen
20 Camera Housing
21a Right End
21b Left End
22 Viewfinder
24 Forward Button
26 Reverse Button
28 Full Screen Version
40 Film Strip
42 Selected Image
43 Frame
44 Image
46 Image
100–152 Steps

What is claimed is:

1. A camera comprising:
 (a) means for capturing an image of a real world scene as an image signal;
 (b) storage means for storing captured images and from which stored images can be read;
 (c) a screen;
 (d) means for displaying on the screen a high resolution version of a stored image from a list of stored images when a location within the list is selected;
 (e) means for displaying on the screen, when a browsing mode is selected, a scrolling strip of low resolution versions of stored images from the list;
 (f) a single control which allows a user to select the location within the list and which also allows a user to select the browsing mode; and
 (g) wherein the single control switches from displaying the high resolution version to the browsing mode when actuated for at least a first predetermined time and switches back to displaying a high resolution version of a selected image on the scrolling strip when released for at least a second predetermined time.

2. A camera according to claim 1 wherein the single control is a pushbutton.

3. A camera according to claim 2 wherein the pushbutton, following selection of the browsing mode, varies the scrolling speed of the scrolling strip.

4. A camera according to claim 3 wherein the pushbutton varies the scrolling speed of the scrolling strip depending upon the pressure applied to the pushbutton.

5. A camera according to claim 3 wherein the pushbutton varies the scrolling speed of the scrolling strip depending upon the time for which the pushbutton was depressed.

6. A camera according to claim 1 wherein when the browsing mode is selected a displayed high resolution image is de-emphasized.

7. A camera according to claim 1 wherein when the control de-selects the browsing mode, the scrolling strip will continue to scroll until the next image in the scrolling strip is centered within the scrolling strip.

8. A camera according to claim 1 wherein the control is a pushbutton with an arrow pointing in one direction in relation to the screen, and wherein when the browsing mode is selected the scrolling strip scrolls in a direction across the screen opposite the arrow.

9. A camera comprising:
 (a) means for capturing an image of a real world scene as an image signal;
 (b) storage means for storing captured images and from which stored images can be read;
 (c) a screen;
 (d) a means for displaying on the screen a high resolution version of a stored image from a list of stored images when a location within the list is selected;

(e) a means for displaying on the screen, when a browsing mode is selected, a scrolling strip of low resolution versions of stored images from the list;

(f) a first single control which allows a user to select the location within the list and which also allows a user to select the browsing mode; and (g) a second single control which allows a user to select the location within the list and which also allows a user to select the browsing mode;

wherein the first and second single controls allow selection within, and browsing through, the list proceeding in opposite directions through the list, and when the first and second single controls are simultaneously activated, the scrolling strip is displayed on the display along with the high resolution image version.

10. A camera according to claim 9 wherein when the first and second single controls are again simultaneously activated, the scrolling strip is removed from the display.

11. A camera comprising:

(a) means for capturing an image of a real world scene as an image signal;

(b) storage means for storing captured images and from which stored images can be read;

(c) a screen;

(d) means for displaying on the screen a high resolution version of a stored image from a list of stored images when a location within the list is selected;

(e) means for displaying on the screen, when a browsing mode is selected, a scrolling strip of low resolution versions of stored images from the list;

(f) a single control which allows a user to select the location within the list and which also allows a user to select and de-select the browsing mode, wherein when the single control de-selects the browsing mode, the scrolling strip will continue to scroll until the next image in the scrolling strip is centered within the scrolling strip.

* * * * *